United States Patent
Prasad et al.

(10) Patent No.: US 11,970,072 B2
(45) Date of Patent: Apr. 30, 2024

(54) VEHICLE ELECTRICAL SYSTEM HAVING A POWER INVERTER AND ELECTRIC MOTOR FOR STEPPING DOWN VOLTAGE

(71) Applicant: GM Global Technology Operations LLC, Detroit, MI (US)

(72) Inventors: Rashmi Prasad, Troy, MI (US); Chandra S. Namuduri, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 624 days.

(21) Appl. No.: 17/208,147

(22) Filed: Mar. 22, 2021

(65) Prior Publication Data
US 2022/0297555 A1  Sep. 22, 2022

(51) Int. Cl.
| | |
|---|---|
| *H02M 7/5387* | (2007.01) |
| *B60H 1/00* | (2006.01) |
| *B60L 1/00* | (2006.01) |
| *B60L 50/60* | (2019.01) |
| *B60L 53/20* | (2019.01) |
| *H02M 1/14* | (2006.01) |
| *H02P 27/08* | (2006.01) |
| *B60L 53/18* | (2019.01) |

(52) U.S. Cl.
CPC .......... *B60L 53/20* (2019.02); *B60H 1/00428* (2013.01); *B60L 1/00* (2013.01); *B60L 50/60* (2019.02); *H02M 1/14* (2013.01); *H02M 7/53871* (2013.01); *H02P 27/08* (2013.01); *B60L 53/18* (2019.02)

(58) Field of Classification Search
None
See application file for complete search history.

(56) References Cited

U.S. PATENT DOCUMENTS

| | | |
|---|---|---|
| 4,588,933 A | 5/1986 | Sun |
| 6,909,201 B2 | 6/2005 | Murty et al. |

(Continued)

FOREIGN PATENT DOCUMENTS

| | | |
|---|---|---|
| CN | 111347893 A | 6/2020 |

OTHER PUBLICATIONS

Huang et al. ("Huang" CN 111347893), Chinese Patent & along with English Translation provided. (Year: 2018).*

*Primary Examiner* — Thienvu V Tran
*Assistant Examiner* — Nusrat Quddus
(74) *Attorney, Agent, or Firm* — Vivacqua Crane PLLC

(57) ABSTRACT

An example of a vehicle electrical system includes a rechargeable energy storage system (RESS) having a first voltage and a power inverter electrically connected to the RESS. The system further includes an electric motor having a plurality of machine windings with each of the machine windings including a polyphase terminal electrically connected to the power inverter. The electric motor further includes a neutral terminal separate from the polyphase terminals. The system further includes an accessory load electrically connected to the power inverter and the neutral terminal of the electric motor, with the accessory load requiring a second voltage that is below the first voltage. A current flows through the machine windings to step down the first voltage to the second voltage. The power inverter is configured to cycle between first and second operational states, such that the power inverter steps down the first voltage to the second voltage.

20 Claims, 9 Drawing Sheets

(56) References Cited

U.S. PATENT DOCUMENTS

| | | |
|---|---|---|
| 7,919,949 B2 | 4/2011 | Namuduri et al. |
| 8,432,126 B2 | 4/2013 | Hasan et al. |
| 8,606,447 B2 | 12/2013 | Namuduri et al. |
| 9,118,210 B2 | 8/2015 | Namuduri et al. |
| 9,153,974 B2 | 10/2015 | Reynolds et al. |
| 9,387,766 B2 | 7/2016 | Hao et al. |
| 9,452,672 B2 | 9/2016 | Namuduri et al. |
| 9,573,454 B2 | 2/2017 | Holmes et al. |
| 9,621,099 B1 | 4/2017 | Namuduri et al. |
| 9,657,705 B2 | 5/2017 | Holmes et al. |
| 9,868,410 B2 | 1/2018 | Namuduri et al. |
| 9,882,521 B2 | 1/2018 | Namuduri et al. |
| 9,973,028 B2 | 5/2018 | Namuduri et al. |
| 10,189,470 B2 | 1/2019 | Atluri et al. |
| 10,259,448 B2 | 4/2019 | Bucknor et al. |
| 10,369,900 B1 * | 8/2019 | Conlon ............... H02J 7/00047 |
| 10,432,130 B2 | 10/2019 | Namuduri et al. |
| 10,605,217 B2 | 3/2020 | Namuduri et al. |
| 10,917,030 B1 * | 2/2021 | Hao ..................... H02K 3/28 |
| 11,345,249 B2 * | 5/2022 | Lee ....................... H02K 11/33 |
| 2008/0173017 A1 | 7/2008 | St. James |
| 2009/0184681 A1 * | 7/2009 | Kuno ...................... B60L 50/53 |
| | | 320/128 |
| 2010/0188071 A1 | 7/2010 | Kajouke |
| 2012/0306424 A1 | 12/2012 | Naik et al. |
| 2014/0239876 A1 | 8/2014 | Hao et al. |
| 2016/0152153 A1 | 6/2016 | Yang et al. |
| 2016/0185225 A1 | 6/2016 | Namuduri et al. |
| 2018/0050686 A1 | 2/2018 | Atluri et al. |
| 2018/0351398 A1 | 12/2018 | Tang et al. |
| 2019/0061537 A1 * | 2/2019 | Ge ......................... B60L 50/51 |
| 2019/0160953 A1 | 5/2019 | Namuduri et al. |
| 2019/0255953 A1 | 8/2019 | Conlon |
| 2020/0070667 A1 | 3/2020 | Wang et al. |
| 2021/0044135 A1 * | 2/2021 | Lee ....................... H02J 7/1492 |
| 2022/0297557 A1 | 9/2022 | Prasad et al. |
| 2022/0302835 A1 | 9/2022 | Prasad et al. |
| 2022/0302836 A1 | 9/2022 | Prasad et al. |
| 2022/0302867 A1 | 9/2022 | Prasad et al. |

\* cited by examiner

VEHICLE ELECTRICAL SYSTEM HAVING A POWER INVERTER AND ELECTRIC MOTOR FOR STEPPING DOWN VOLTAGE

INTRODUCTION

The present disclosure relates to a vehicle electrical system, and more particularly to a vehicle electrical system having a power inverter and an electric motor for stepping down voltage of a battery.

Propulsion systems for battery electric vehicles (BEVs) typically include one or more high-voltage polyphase electric machines in the form of a motor generator unit or an electric traction motor. The electric machines deliver power to or draw power from a rechargeable direct current (DC) battery pack. The energized electric machines adjust torques of the various gear sets of the propulsion system to achieve optimal system efficiency. The BEVs further include separate DC/DC converters for stepping down voltage from the battery pack to support a voltage of an accessory load that is below than the available voltage of the battery pack. The DC/DC converter may increase the cost, mass, and volume of the vehicle electrical system.

The propulsion systems typically further include a power inverter module having semiconductor switches that are controlled via pulse-width modulation or other switching control signals for converting the battery output voltage to an alternating current (AC) output voltage. The AC output voltage from the power inverter module is ultimately transmitted to the individual phase windings of the electric machine. The energized electric machine provides torque or other driving force to the propulsion system of the vehicle.

Thus, while existing vehicle electrical systems include DC/DC converters to achieve their intended purpose, there is a need for a new and improved vehicle electrical system that addresses these issues.

SUMMARY

According to several aspects of the present disclosure, a vehicle electrical system includes a rechargeable energy storage system (RESS) having a first voltage and a power inverter electrically connected to the RESS. The system further includes an electric motor having a plurality of machine windings with each of the machine windings including a polyphase terminal electrically connected to the power inverter. The machine windings further include a neutral terminal separate from the polyphase terminals. The system further includes an accessory load selectively connected to the RESS or the neutral terminal of the electric motor, with the accessory load requiring a second voltage that is below the first voltage. A current flows through at least one of the machine windings to step down a voltage from the first voltage of the RESS to the second voltage of the accessory load. The power inverter is configured to cycle between a first operational state where the power inverter connects the RESS to the machine windings of the electric motor and a second operational state where the power inverter disconnects the RESS from the machine windings and interrupts current to the machine windings, such that the power inverter steps down the first voltage of the RESS to the second voltage of the accessory load.

In one aspect, the system further includes an accessory load switch disposed between the neutral terminal of the electric motor and the accessory load. The accessory load switch is configured to transition between a closed state to allow current to flow from the electric motor to the accessory load and an open state to prevent current from flowing to the accessory load.

In another aspect, the machine windings are a plurality of inductors.

In another aspect, the power inverter includes a set of semiconductor inverter switches that are configured to convert direct current (DC) power to alternating current (AC) power.

In another aspect, each of the semiconductor inverter switches is a voltage-controlled switching device.

In another aspect, the voltage-controlled switching device is at least one of a silicon insulated gate bipolar transistor (IGBT), a silicon carbide (SiC) metal-oxide semiconductor field effect transistor (MOSFET), a silicon (Si) superjunction MOSFET, a Gallium nitride (GaN) field-effect transistor (FET), a SiC junction-gate field-effect transistor (JFET), a wideband-gap (WBG), or an ultra-wideband-gap (UWBG) semiconductor power switching device.

In another aspect, the power inverter includes a plurality of phase legs, with each of the phase legs having a pair of the semiconductor inverter switches, and each of the phase legs is connected to a corresponding one of the inductors.

In another aspect, the phase legs include first, second, and third phase legs, and at least one of the semiconductor inverter switches of the first, second, and third phase legs is pulse-width modulated to allow current to flow through an associated one of the first, second, and third phase legs.

In another aspect, the system further includes a ripple inductor connected in series between neutral terminal of the electric motor and the accessory load, and the ripple inductor is configured to mitigate current ripple and torque disturbance.

In another aspect, the accessory load switch is a contactor.

According to several aspects of the present disclosure, a vehicle electrical system includes a rechargeable energy storage system (RESS) having a first voltage and a power inverter electrically connected to the RESS. The system further includes an electric motor having a plurality of machine windings with each of the machine windings including a polyphase terminal electrically connected to the power inverter. The machine windings further include a neutral terminal separate from the polyphase terminals. The system further includes an accessory load selectively connected to the RESS or the neutral terminal of the electric motor. The accessory load requires a second voltage that is below the first voltage. The system further includes a controller electrically connected to the power inverter and configured to transmit a plurality of control signals to the power inverter, in response to the controller receiving a command for a buck operation. The power inverter may be disposed in a first operational state for connecting the RESS to the machine windings of the electric motor, and the power inverter may be disposed in a second operational state for disconnecting the RESS from the machine windings, in response to the power inverter receiving the associated control signals from the controller. The power inverter is configured to cycle between the first and second operational states, such that the power inverter and the electric motor step down the first voltage of the RESS to the second voltage of the accessory load.

In one aspect, the system further includes an accessory load switch disposed between the neutral terminal of the electric motor and the accessory load. The accessory load switch is configured to transition between a closed state to allow current to flow from the electric motor to the accessory load and an open state to prevent current from flowing to the accessory load.

In another aspect, the accessory load includes at least one of a propulsion support system, a climate control system, and a driver comfort system.

In another aspect, the machine windings are a plurality of inductors.

In another aspect, the power inverter includes a set of semiconductor inverter switches that are configured to convert direct current (DC) power to alternating current (AC) power.

In another aspect, each of the semiconductor inverter switches is a voltage-controlled switching device.

In another aspect, the power inverter includes a plurality of phase legs, with each of the phase legs having a pair of the semiconductor inverter switches, and each of the phase legs is connected to a corresponding one of the inductors.

In another aspect, the phase legs includes first and second phase legs, and at least one of the semiconductor inverter switches of the first and second phase legs is pulse-width modulated to allow current to flow through an associated one of the first and second phase legs.

According to several aspects of the present disclosure, a method of operating a vehicle electrical system is provided. The system includes a rechargeable energy storage system (RESS), a power inverter, and an electric motor that includes a plurality of machine windings. The system further includes an accessory load connected to the machine windings of the electric motor. The method includes the controller generating a plurality of control signals, in response to the controller receiving a command for a buck operation. The power inverter cycles between first and second operational states, in response to the power inverter receiving the control signals from the controller. The power inverter and the electric motor step down a first voltage of the RESS to a second voltage for supporting the accessory load, in response to the power inverter cycling between the first and second operational states.

In one aspect, the method further includes the controller generating first and second control signals, in response to the controller receiving a command for a buck operation. The method further includes the power inverter being disposed in the first operational state, in response to the power inverter receiving the first control signal from the controller. The method further includes the power inverter electrically connecting the RESS to the machine windings of the electric motor that is in turn electrically connected to the accessory load, in response to the power inverter being disposed in the first operational state. The method further includes the power inverter being disposed in the second operational state, in response to the power inverter receiving the second control signal from the controller. The method further includes the power inverter electrically disconnecting the RESS from the machine windings of the electric motor, in response to the power inverter being disposed in the second operational state. The method further includes the power inverter and the electric motor stepping down the first voltage of the RESS to the second voltage of the accessory load, in response to the power inverter electrically connecting and disconnecting the RESS to the machine windings of the electric motor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
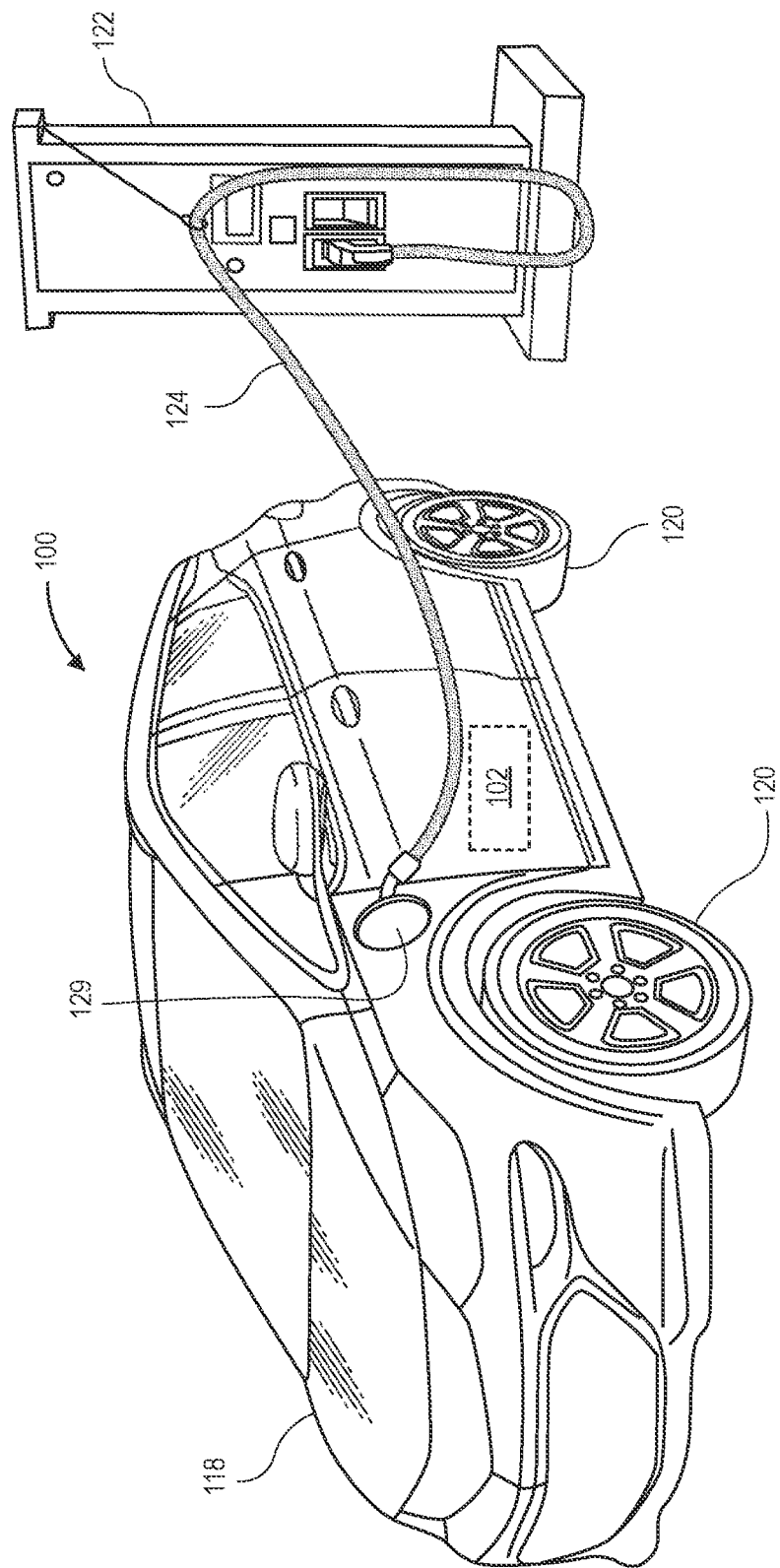
FIG. 1 is a perspective view of one example of a motor vehicle having a vehicle electrical system connected to an off-board power source.

The following description is merely exemplary in nature and is not intended to limit the present disclosure, application, or uses.

The present disclosure describes one example of a motor vehicle 100 (FIG. 1) having an electrical system 102 (FIGS. 2, 3A, and 3B) for stepping down voltage from an onboard rechargeable energy storage system 104 (RESS) to support one or more accessory loads 106 when charging the RESS 104. As described in detail below, the system 102 includes a power inverter 108 with a set of switches 110 and an electric motor 112 with a plurality of machine windings L1-L3 connected to the switches 110. The system 102 further includes a controller 116 and an inverter controller 180 for selectively transitioning one or more of the switches 110 between open and closed states to cause electrical power to be directed from the RESS 104 through the machine windings L1-L3 to step down a first voltage of the RESS and support a second voltage of the accessory load 106.

Referring to FIG. 1, one example of the motor vehicle 100 is a plug-in electric vehicle having a body 118, a plurality of drive wheels 120, and the system 102. The system 102 can include a DC charging circuit 128 (FIG. 2) that incorporates propulsion/traction drive components of the vehicle 100. The ordinary functions of those components may include powering the electric motor 112, e.g., a traction motor, to generate and deliver motor torque to the drive wheels 120 to provide torque or other driving force to the wheels 120, or for performing other useful work aboard the vehicle 100.

The system 102 can be used as part of any mobile system with an off-board power source 122, such as DC fast-charging station that is disposed in a fixed location and configured to charge the RESS 104. A charging cable 124 and a charging port 126 electrically connect the DC charging circuit 128 (FIG. 2) to the DC fast-charging station 122 during a DC fast-charging operation. The body 118 may define or include the charging port 126 at a user-accessible location. One non-limiting example of the charging cable 124 can be an SAE J1772 charge connector, CHAdeMO, or another suitable regional or national standard charging plug or connector. The present teachings are independent of the particular charging standard that is ultimately employed in a DC fast-charging operation involving the DC fast-charging station 122, and thus the examples described herein are merely illustrative. In other non-limiting examples, the system may be used as part of a stationary or mobile power plant, a robot, or a platform. The system may be used as part of an aircraft, a marine vessel, and a rail vehicle. For illustrative consistency, an application of the system as an integral part of the motor vehicle 100 will be described hereinafter without limiting the present disclosure to such an implementation.

Figure 3A:
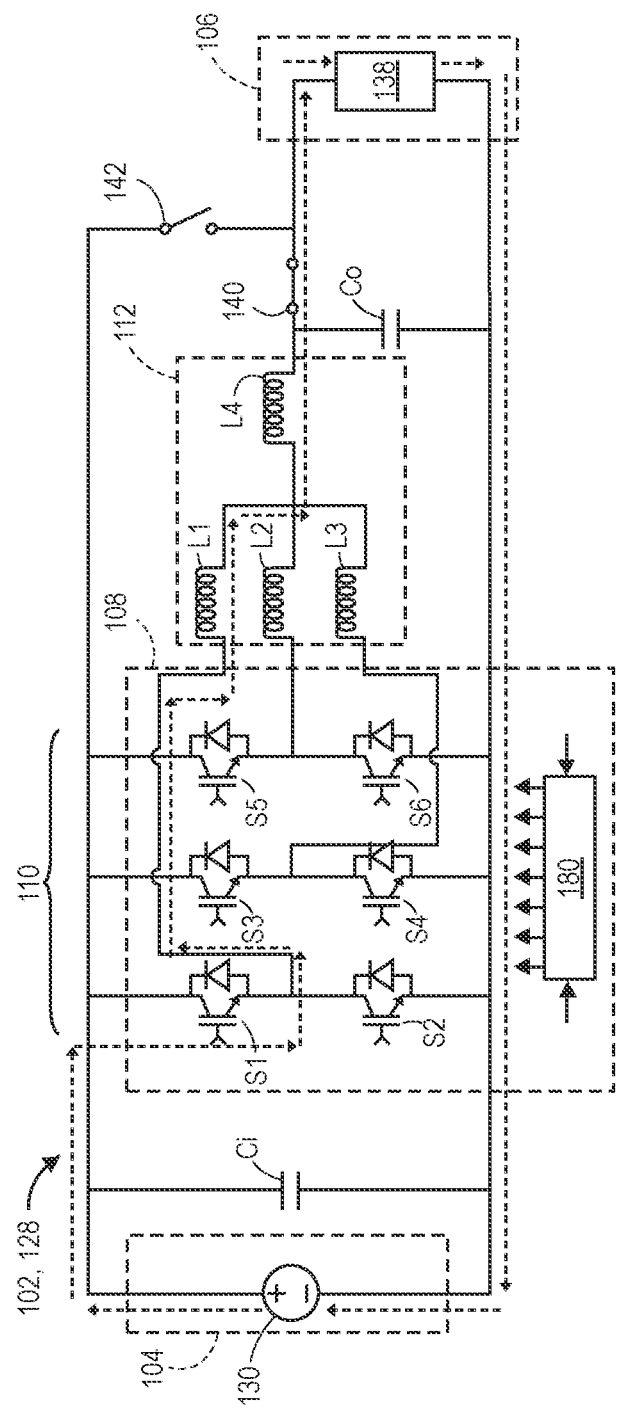
FIG. 3A is a circuit schematic of the system of FIG. 2, illustrating the power inverter disposed in a first operational state where the power inverter electrically connects the RESS to the electric motor that is in turn electrically connected to the accessory load.
Figure 3B:
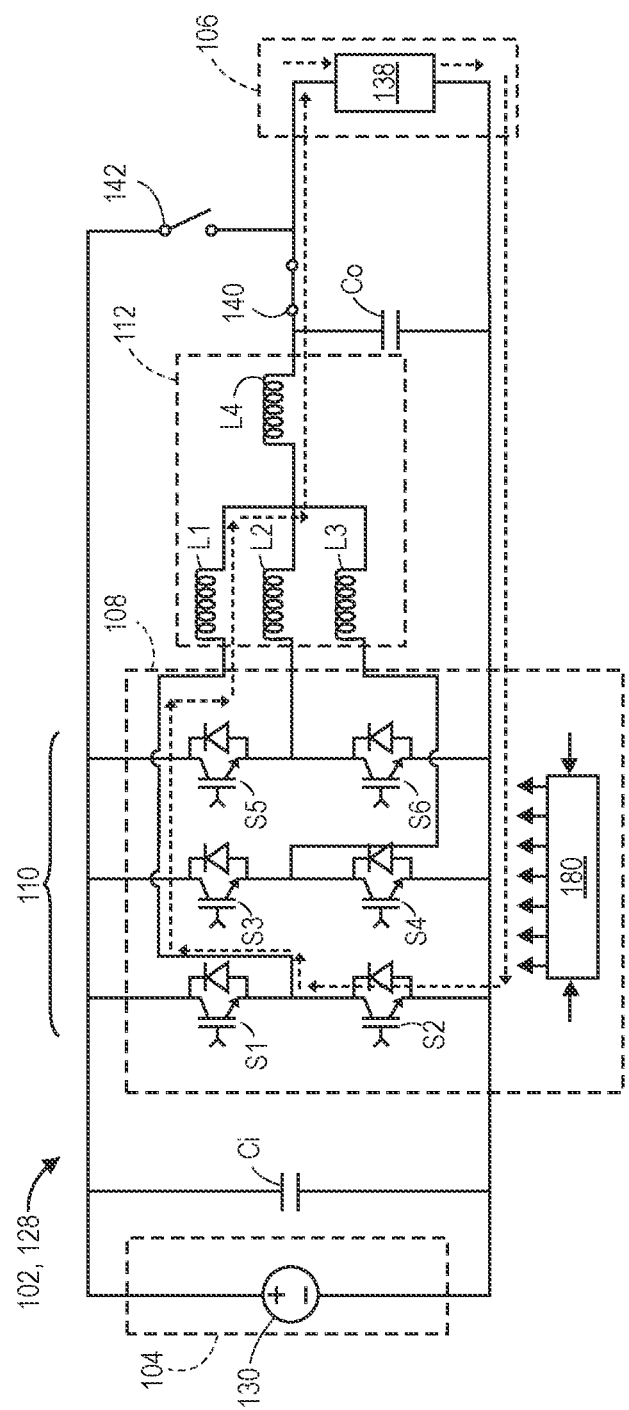
FIG. 3B is a circuit schematic of the system of FIG. 2, illustrating the power inverter disposed in a second operational state where the power inverter electrically disconnects the RESS from the electric motor.

Referring now to FIGS. 3A and 3B, the system 102 includes the RESS 104, which can include one or more high-voltage, independently-rechargeable battery packs. Non-limiting examples of the RESS include a multi-cell lithium ion battery pack, a zinc-air battery pack, a nickel-metal hydride battery pack, and a lead acid direct current battery pack. The RESS 104 is adapted for storing high-voltage electrical energy used for propelling the vehicle. The RESS 104 may be a deep-cycle, high-ampere capacity battery system rated for a first voltage. The first voltage can be in the range between four hundred (400) to approximately eight hundred (800) volts direct current (VDC). However, it is contemplated that the RESS 104 can be rated for a first voltage that is higher than 800 VDC depending on a desired vehicle range, gross vehicle weight, and power ratings of the various loads drawing electrical power from the RESS 104. As shown in FIGS. 3A, 3B, 5A, and 5B, a DC link capacitor Ci can be connected across positive and negative terminals. The RESS 104 may be electrically connected to a high-voltage DC bus bar 136 and the power inverter 108 for governing the transmission of electrical energy to and from the electric motor 112.

The system 102 further includes the power inverter 108 that can selectively connect the RESS 104 to the electric motor 112. The power inverter 108 may be part of a transmission power inverter module (TPIM), that connects the off-board power source 122, e.g., the off-board DC fast-charging station or vehicle, to the RESS 104. The power inverter 108 may include a set 110 of semiconductor inverter switches S1-S6 ("inverter switches") that cooperatively convert direct current (DC) power from the RESS 104 to alternating current (AC) power for powering the electric motor 112 via high-frequency switching. Each inverter switch S1-S6 may be embodied as a voltage-controlled switching device in the form of a silicon insulated gate bipolar transistor (IGBT), a silicon carbide (SiC) metal-oxide semiconductor field effect transistor (MOSFET), a silicon (Si) superjunction MOSFET, a Gallium nitride (GaN) field-effect transistor (FET), a SiC junction-gate field-effect transistor (JFET), a wideband-gap (WBG), an ultra-wideband-gap (UWBG) semiconductor power switching device, or other suitable switch having a corresponding gate to which a gate signal is applied to change the on/off state of a given switch.

One or more of the inverter switches can be associated with each phase of a three-phase electric motor 112. In this example, at least one pair of semiconductor switches for each phase of the three-phase traction motor 112. Each pair of switches, e.g., switches S1 and S2 (Phase A), switches S3 and S4 (Phase B), and switches S5 and S6 (Phase C), may referred to as phase legs of the power inverter 108. For example, the power inverter 108 may include at least three (3) phase legs. In this example, the inverter switches S1-S6 are contactors that are adapted to close under electrical load so as to ensure the instantaneous or near instantaneous delivery of electrical power to the vehicle's propulsion system and to drive any number of in-vehicle accessories. The power inverter 108 may incorporate multiple phases and respective motor control modules operable to receive motor control commands and control inverter states therefrom for providing motor drive or regenerative functionality.

The system 102 further includes the electric motor 112 having the machine windings L1-L3, with each winding having a polyphase terminal 132 (FIG. 2) electrically connected to the power inverter 108. The machine windings L1-L3 further include a neutral terminal 134 (FIG. 2) separate from the polyphase terminals 132. In this example, the electric motor is a three-phase traction motor 112 with three windings L1-L3 and associated terminals 132, and the machine windings L1-L3 are inductors. Each inductor L1-L3, is electrically connected to a corresponding one of the three phase terminals of the power inverter 108. Inductor L4 can be electrically connected to the neutral terminal of the motor 112 and positioned in series with one or more of the machine windings L1-L3 to reduce, e.g., mitigate, current ripple and torque disturbance. While illustrated as including only three machine windings L1-L3, it is understood that the traction motor 112 may include additional machine windings 166 depending on a motor configuration.

The system 102 may further include one or more accessory loads 106 electrically connected to the power inverter 108 and the neutral terminal 134 of the electric motor 112, with the accessory load 106 requiring a second voltage that is below the first voltage of the RESS 104. The accessory load 106 may be represented as Vload 138, and a filter capacitor Co may be electrically connected across Vload 138. Continuing with the previous example where the RESS 104 may be adapted to store approximately eight hundred (800) VDC, the accessory load 106 may require the second voltage, such as approximately four hundred (400) VDC. However, it is contemplated that the accessory load 106 may any voltage below the first voltage of the RESS 104. Non-limiting examples of the accessory load can include at least one of a propulsion support system, a climate control system, and a driver comfort system. In other examples where the system includes multiple accessory loads, it is contemplated that the accessory loads can have various loads that are different from one another and draw electrical power from the RESS 104.

Continuing with the present example where the accessory load 106 is supported by a second voltage below the available first voltage of the RESS 104, the system 102 further includes an accessory load switch 140 disposed between the neutral terminal 134 of the electric motor 112 and the accessory load 106 for controlling a buck operation. The accessory load switch 140 is configured to transition between a closed state to allow current to flow from the electric motor 112 to the accessory load 106 and an open state to prevent current from flowing to the accessory load 106. The system 102 further includes an accessory load switch 142 disposed between the RESS 104 and the accessory load for allowing current to flow from the RESS 104 directly to an accessory load without stepping down the voltage when, for example, an accessory load has a voltage equal to the available voltage of the RESS 104.

The system further includes a controller 116 and an inverter controller 180 electrically connected to inverter switches S1-S6 of the power inverter 108 and the accessory load switches 140, 142. The controller 116 and/or the inverter controller 180 are configured to transmit a plurality of control signals to the inverter switches S1-S6 and the accessory load switches 140, 142 to allow current to flow from the RESS 104 through the machine windings L1-L3 to the accessory load 106 during the first operational state (FIG. 3A) and to prevent current to flow from the RESS 104 through the machine windings L1-L3 to the accessory load 106 during the second operational state (FIG. 3B).

Each of the controller 116 and the inverter controller 180 include at least one processor and sufficient memory for storing computer-readable instructions. The memory includes tangible, non-transitory memory, e.g., read only memory, whether optical, magnetic, flash, or otherwise. The controller 116 and/or the inverter controller 180 also include sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry. The controller 116 and/or the inverter controller 180 can receive charging request signals from one or more electronic control units (ECUs) of the vehicle 100. For example, an ECU may provide a signal indicating that the RESS 104 needs to provide stepped down voltage to an accessory load is supported by the second voltage that is below the first voltage of the RESS 104, and the controller 116 and/or the inverter controller 180 can initiate the buck DC-DC operation as discussed below. If the RESS 104 is capable of directly supplying the required voltage for the accessory load, the controller 116 can transmit control signals to switches 140, 142, such that the switch 140 is open can the switch 142 is closed.

In one example, the inverter controller 180 can receive signals from the controller 116 and/or from sensors within the traction motor 112. For example, the traction motor 112 can include phase current sensors and/or rotor position sensors and provide signals indicative of a phase current and/or a position of the rotor, respectively. The inverter controller 180 can control the semiconductor switches S1-S6 by supplying a signal to one or more gates to cause the semiconductor switches S1-S6 to transition between an open state and a closed state, as discussed in greater detail below.

In some implementations, software for the controller 116 and/or the inverter controller 180 may be updated based via over-the-air programming. For example, software updates can be transmitted to the controller 116 via one or more suitable communication networks from a data source, such as an original equipment manufacturer (OEM). The over-the-air updates can provide desired parameters to adjust charging power by adjusting the inverter control signals, e.g., current command, frequency, duty cycle, phase shift, etc., for one or more switches S1-S6 according to a charging power level via the inverter controller 180.

The power inverter 108 is configured to cycle between a first operational state (FIG. 3A) where the power inverter 108 connects the RESS 104 to the machine windings L1-L3 of the electric motor 112 and a second operational state (FIG. 3B) where the power inverter 108 disconnects the RESS from the machine windings L1-L3 of the electric motor 112 and interrupts current to the machine windings L1-L3, such that the power inverter 108 steps down the first voltage of the RESS 104 to the second voltage of the accessory load 106.

As shown in FIG. 3A, the power inverter 108 is disposed in the first operational state, where one or more of the inverter switches S1, S3, and S5 is disposed in a closed state, the inverter switches S2, S4, and S6 are disposed in an open state, and the accessory load switch 142 is disposed in the closed state to allow current to flow from the RESS 104 to the associated inductors L1-L3. The associated machine windings L1-L3 perform a buck conversion, in response to the inverter switches S1-S6 and the accessory load switch 140 receiving the control signals from the controller 116 and/or the inverter controller 180. In the illustrated example, current flows through the inductors L1, L4, in response to the inverter switch S1 and the accessory load switch 140 being disposed in the closed state and the inverter switches S2-S6 being disposed in the open state. Similarly, current can flow through the inductors L2, L4, in response to the inverter switch S5 and the accessory load switch 140 being disposed in the closed state and the inverter switches S1-S4 and S6 being disposed in the open state. Current can flow through the inductors L3, L4, in response to the inverter switch S3 and the accessory load switch 140 being disposed in the closed state and the inverter switches S1, S2, and S4-S6 being disposed in the open state. The inverter switches S1, S3, and/or S5 can be subjected to a pulse-width-modulation signal from the inverter controller 180 to transition the inverter switches S1, S3 and S5 between the open and closed states. In this non-limiting example the duty cycle may be fifty percent (50%).

Referring to FIG. 3B, the power inverter 108 is disposed in the second operational state, where each of the inverter switches S1, S3, and S5 are disposed in the open state to prevent current from flowing from the RESS 104 to the associated inductors L1-3 of the electric motor 112. One or more of the inverter switches S2, S4, and S6 are disposed in the closed state to allow current to continue flowing from one or more of the associated inductors L1-L3 to the accessory load 106. In the illustrated example, current flows from the inductors L1, L4 to the accessory load 106, in response to the accessory load switch 142 and the inverter switch S2 being disposed in the closed state and the inverter switches S1-S3, S5, and S6 being disposed in the open state. In another example, current flows from the inductors L2, L4 to the accessory load 106, in response to the accessory load switch 142 and the inverter switch S6 being disposed in the closed state and the inverter switches S1-S5 being disposed in the open state. In still another example, current flows from the inductors L3, L4 to the accessory load 106, in response to the accessory load switch 142 and the inverter switch S4 being disposed in the closed state and the inverter switches S1-S3, S5, and S6 being disposed in the open state. It is contemplated that any one or more of the inductors can continue to supply power to the accessory load when the RESS is disconnected from the inductors. The inverter switches S2, S4, and/or S6 can be subjected to a pulse-width-modulation signal from the inverter controller 180 to transition the inverter switches S2, S4 and S6 between the open and closed states. In this non-limiting example the duty cycle may be fifty percent (50%).

Figure 2:
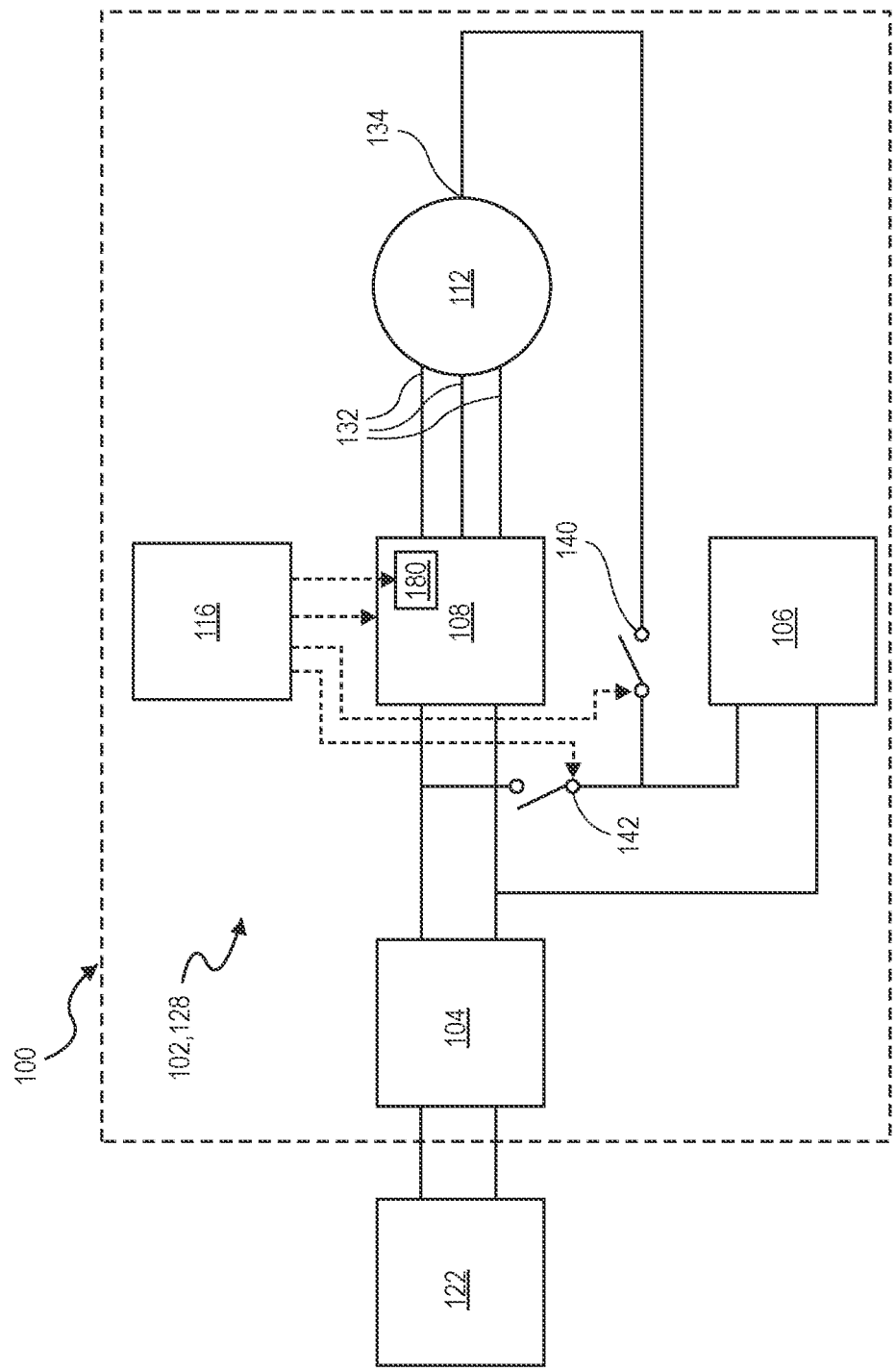
FIG. 2 is a block diagram of the system of FIG. 1, illustrating the system having a power inverter and an electric motor for stepping voltage down from a first voltage of a rechargeable electronic storage system (RESS) to a second voltage of an accessory load.
Figure 4:
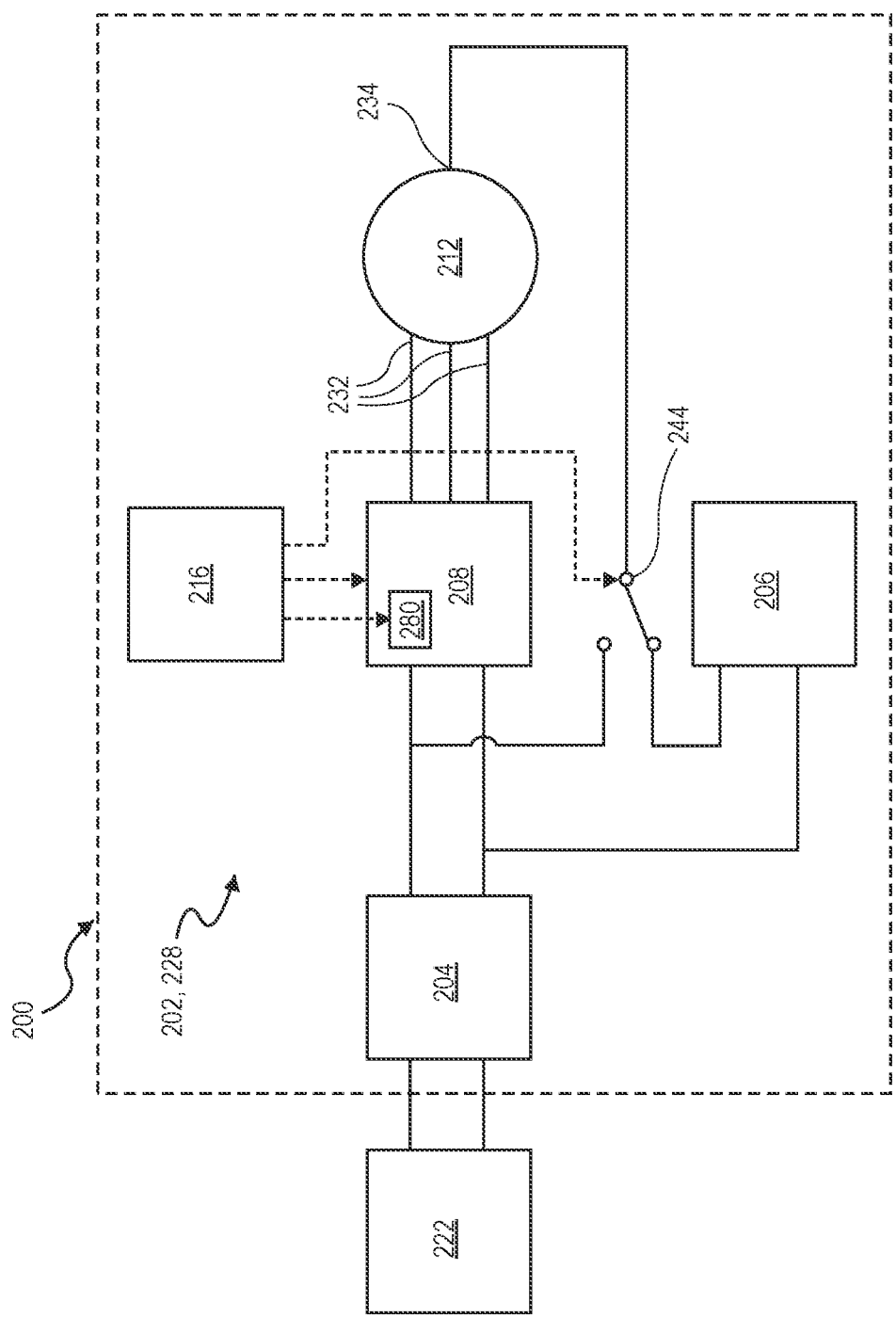
FIG. 4 is a block diagram of another example of the system of FIG. 1, illustrating the system having a Single Pole Double Throw switch for connecting the accessory load to the electric motor or the RESS.
Figure 5A:
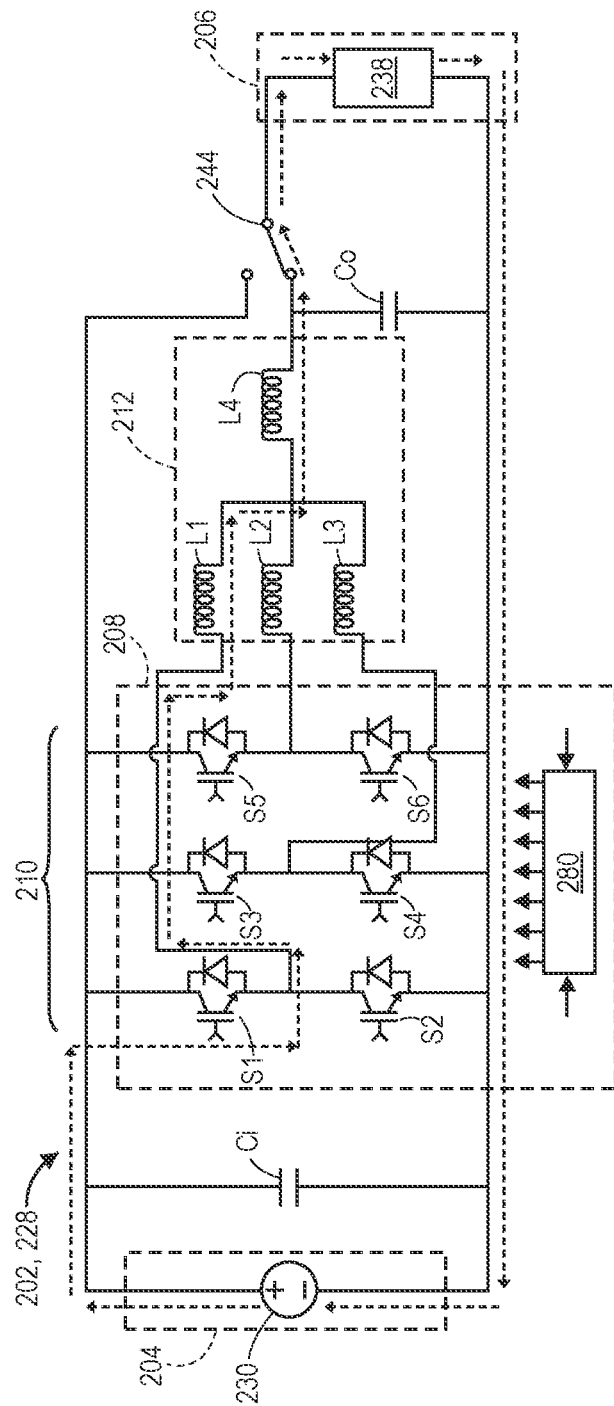
FIG. 5A is a circuit schematic of the system of FIG. 4, illustrating the power inverter disposed in a first operational state where the power inverter electrically connects the RESS to the electric motor that is in turn electrically connected to the accessory load.
Figure 5B:
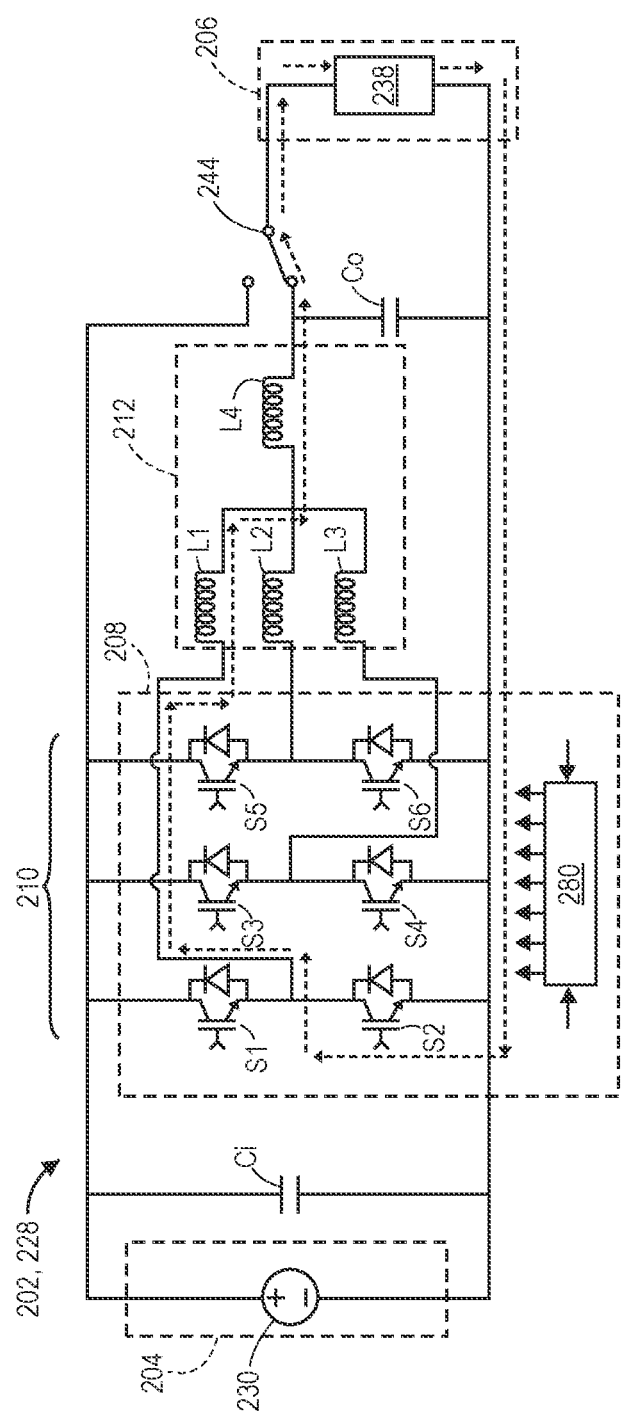
FIG. 5B is a circuit schematic of the system of FIG. 4, illustrating the power inverter disposed in a second operational state where the power inverter electrically disconnects the RESS from the electric motor.

Referring to FIGS. 4, 5A, and 5B, another example of an electrical system 202 is similar to the system 102 of FIGS. 2, 3A, and 3B and has the same components identified by the same reference numbers increased by 100. While the system of FIGS. 2, 3A, and 3B includes the accessory load switches 140, 142, the system 202 has a Single Pole Double Throw switch 244 selectively connecting the accessory load 206 to the electric motor 212 or the RESS 204.

Figure 6:
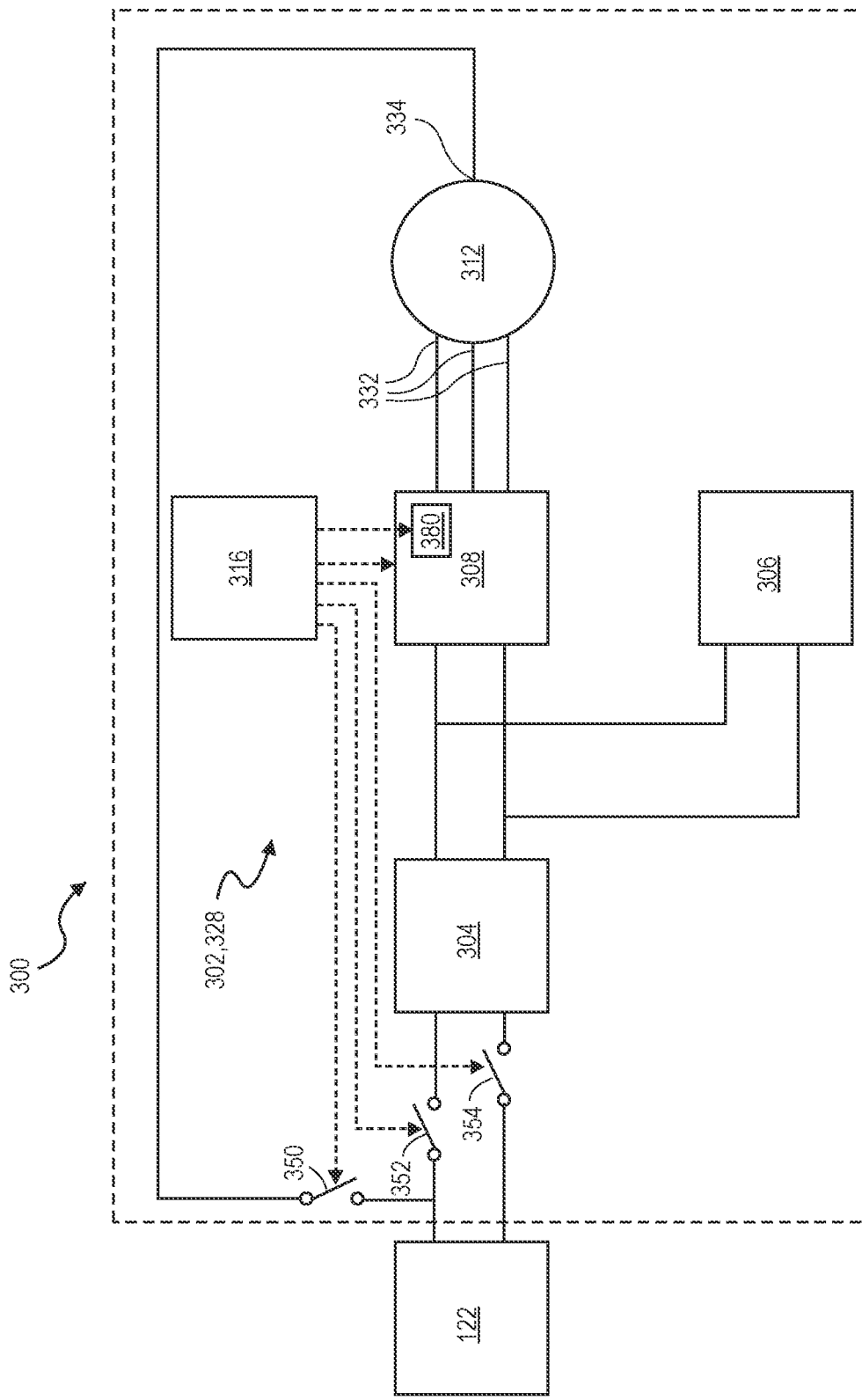
FIG. 6 is a circuit schematic of another electrical system of FIG. 1, illustrating the system having a Single Pole Double Throw switch.

Referring to FIG. 6, another example of an electrical system 302 is similar to the system 102 of FIGS. 2, 3A, and 3B and has the same components identified by the same reference numbers increased by 200. While the system 102 of FIGS. 2, 3A, and 3B includes the accessory load switch 140 disposed between the neutral terminal 134 of the electric motor 112 and the accessory load 106, the system 302 includes an off-board switch 350 disposed between the neutral terminal 134 of the electric motor 112 and the off-board power source 322. While the system 102 of FIGS. 2, 3A, and 3B includes the accessory load switch 142 disposed between the RESS 104 and the accessory load 104, the system 302 includes an off-board switch 352 disposed between the RESS 304 and the off-board power source 322. The system 302 further includes an off-board switch 352 disposed between the RESS 304 and the off-board power source 322. During a buck operation, the switches 350, 354 can be moved to the closed state and switch 352 can be moved to the open state, such that the power inverter 308 and the electric motor 312 can step down the voltage of the RESS to support or charge the off-board power source 322. Furthermore, when the RESS 304 and the off-board power source 322 are rated for a common voltage, the switches 352, and 354 can be moved to the closed state, and the switch 350 can be moved to the open state. The off-board power source 322 can be a RESS of another vehicle for a V2V charging operation. In other non-limiting examples, the off-board power source can instead be an accessory load, such as power tools receiving electrical energy from the system 300 of a truck.

Figure 7:
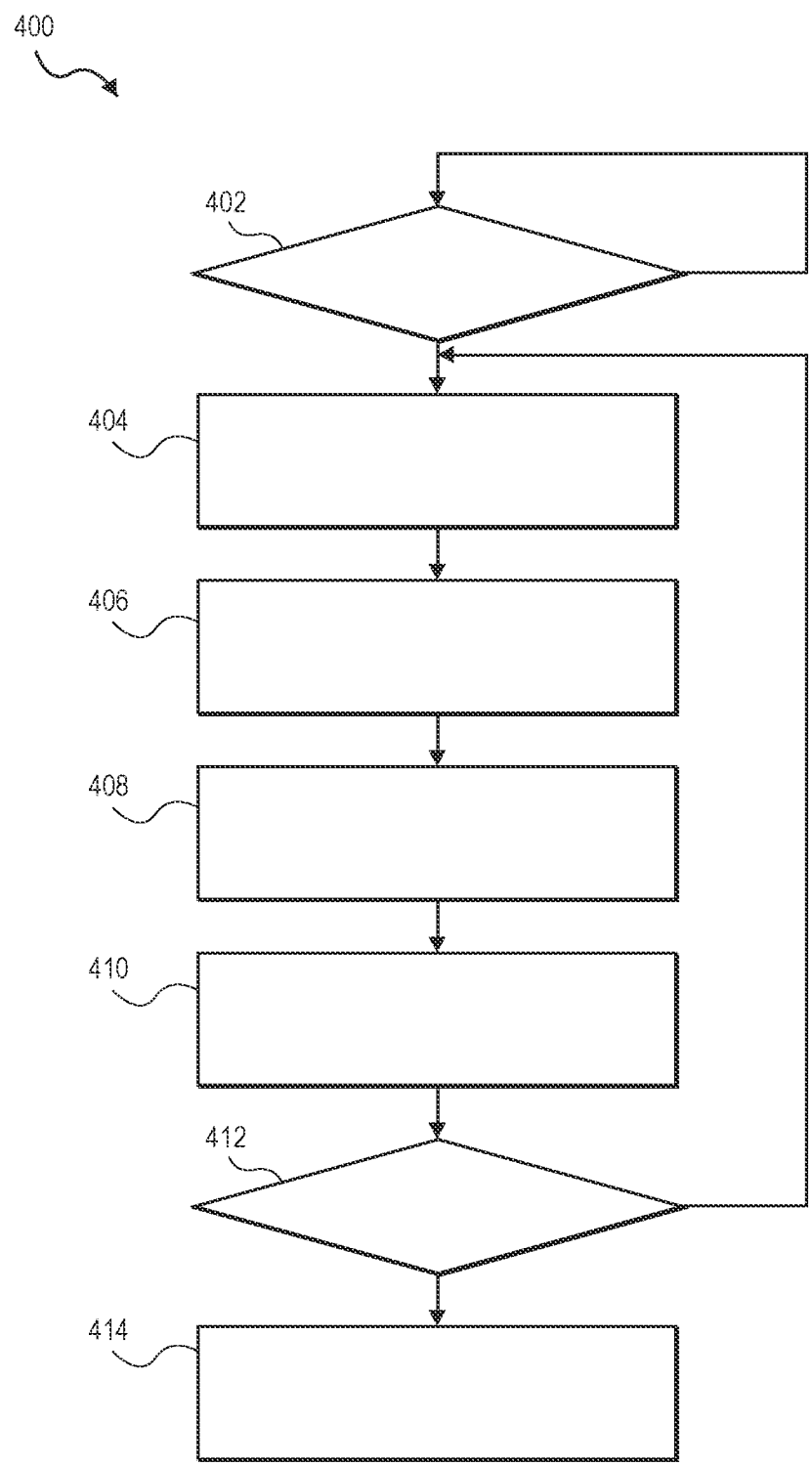
FIG. 7 is a flow chart illustrating one example of a method for operating the system of FIG. 2.

Referring to FIG. 7, a flow chart of an exemplary method 300 is provided for operating the system 102 of FIG. 2 to support one or more accessory loads 106 of the vehicle 100. Blocks of the method 400 can be executed by the controller 116 and the inverter controller 180. The method 400 begins at block 402 with the controller 116 determining whether the controller 116 a charge signal associated with a buck operation. For example, one or more ECUs associated with the accessory loads 106 may send a charge signal to the inverter controller 180 indicating that the accessory loads 106 require charging. If the controller 116 has received the charge signal, the method proceeds to block 404. If the controller 116 has not received the charge signal, the method 400 repeats block 402.

At block 404, the controller 116 and/or the inverter controller 180 generate one or more control signals. The control signals can be voltage signals that cause the switches S1-S6 of the power inverter 108 to transition to open and closed states. More specifically, in this example, the controller 116 and/or the inverter controller 180 generate a first control signal associated with the RESS 104 electrically connecting to one or more of the inductors L1-L3 of the machine windings, and the controller 116 and/or the inverter controller 180 generate a second control signal associated with the RESS 104 electrically disconnecting from one or more of the inductors L1-L3 of the machine windings L1-L3. The controller 116 also transmits control signals to the accessory load switches 140, 142 to cause the switches 140, 142 to transition to a desired operating state, e.g., the open state or the closed state.

At block 406, the power inverter 108 cycles between the first and second operational states, in response to the power inverter 108 receiving the control signals from the inverter controller 180. More specifically, the power inverter 108 is disposed in the first operational state, in response to the power inverter 108 receiving the first control signal from the inverter controller 180. In the first operational state, one or more of the inverter switches S1-S3 are disposed in the closed state, and each of the inverter switches S4-S6 are disposed in the open state. The inverter switches S1, S3, and/or S5 can be subjected to the first control signal in the form of a pulse-width-modulation signal from the inverter controller 180 to transition the inverter switches S1, S3, and S5 between the open and closed states during the first operational state. The power inverter 108 is disposed in the second operational state, in response to the power inverter 108 receiving the second control signal from the inverter controller 180. In the second operational state, each of the inverter switches S1-S3 are disposed in the open state, and one or more of the inverter switches S4-S6 are disposed in the closed state. The inverter switches S2, S4, and/or S6 can be subjected to the second control signal in the form of a pulse-width-modulation signal from the inverter controller 180 to transition the inverter switches S2, S4, and S6 between the open and closed states during the second operational state.

At block 408, the power inverter 108 electrically connects the RESS 104 to one or more of the machine windings L1-L3 of the electric motor 112, and current flows from the RESS 104 through one or more of the machine windings L1-L3 to the accessory load 106, in response to the power inverter being disposed in the first operational state. The power inverter electrically disconnects RESS 104 from the machine windings L1-L3 of the electric motor 112, and current does not flow from the RESS 104 to the machine windings L1-L3, in response to the power inverter 108 being disposed in the second operational state. As discussed above, the inverter 108 and the machine windings L1-L3 function as a buck converter by causing the current to flow from the inverter 108 through the machine windings L1-L3 of the electric motor 112, which reduces the voltage from the first voltage, e.g., 800V, to the second voltage, e.g., 400V. In this example, the accessory load switch 142 is also in the closed state to provide a connection between the accessory loads 106 and the machine windings L1-L3.

At block 410, the power inverter 108 and the electric motor 112 step down the voltage from the available first voltage of the RESS 104 to the second voltage supporting the accessory load 106, in response to the power inverter 108 cycling between the first and second operational states.

At block 412, the controller 116 determines whether the controller 116 has received a terminate charge signal from one or more ECUs associated with the accessory loads 106. If the controller 116 has not received the terminate charge signal, the method 400 returns to block 404. If the controller 116 has received the terminate charge signal, the method 400 proceeds to the block 414.

At block 414, the controller 116 and/or the inverter controller 180 transmit signals to transition the inverter switches S1-S6 and the accessory load switches 140, 142 to cause the RESS 104 to deliver power to the electric motor 112.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle electrical system, comprising:
a rechargeable energy storage system (RESS) having a first voltage;
a power inverter electrically connected to the RESS;
an electric motor having a plurality of machine windings with each of the machine windings including a polyphase terminal electrically connected to the power inverter, and the electric motor further having a neutral terminal separate from the polyphase terminals; and
an accessory load selectively connected to one of the RESS and the neutral terminal of the electric motor, with the accessory load requiring a second voltage;
a first accessory load switch disposed between the neutral terminal of the electric motor and the accessory load;
a second accessory load switch disposed between the RESS and the accessory load;
wherein the power inverter includes semiconductor switches S1, S3, and S5 each disposed between the RESS and a corresponding one of the polyphase terminals, and includes semiconductor switches S2, S4, and S6 each connected between the accessory load and a corresponding one of the polyphase terminals, wherein the semiconductor switches S1-S6 cooperatively convert direct current (DC) power from the RESS to alternating current (AC) power for powering the electric motor via high-frequency switching;
wherein the power inverter is configured to cycle between:
a first operational state where the power inverter connects the RESS to the plurality of machine windings of the electric motor such that current flows from the RESS through the polyphase terminals to the accessory load via closing the first accessory load switch, opening the second accessory load switch, closing one of the semiconductor switches S1, S3, and S5 and opening the remaining semiconductor switches S1-S6;
a second operational state where the power inverter disconnects the RESS from the plurality of machine windings of the electric motor and interrupts current to the machine windings, such that the power inverter steps down the first voltage of the RESS to the second voltage of the accessory load, via closing the first accessory load switch, opening the second accessory load switch, opening the semiconductor switches S1, S3, and S5 to disconnect the RESS from the polyphase terminals, and closing one or more of the remaining semiconductor switches S2, S4, and S6 to allow current to flow from one or more of the polyphase terminals to the accessory load; and
a third operational state where the RESS directly charges the accessory load without stepping down the voltage via opening the first accessory load switch and closing the second accessory load switch.

2. The vehicle electrical system of claim 1, wherein the accessory load comprises at least one of a propulsion support system, a climate control system, and a driver comfort system.

3. The vehicle electrical system of claim 1, wherein the plurality of machine windings comprise a plurality of inductors.

4. The vehicle electrical system of claim 3, wherein the semiconductor switches S1-S6 are configured to convert direct current (DC) power to alternating current (AC) power.

5. The vehicle electrical system of claim 4, wherein each of the semiconductor switches S1-S6 comprises a voltage-controlled switching device.

6. The vehicle electrical system of claim 5, wherein the voltage-controlled switching device comprises at least one of a silicon insulated gate bipolar transistor (IGBT), a silicon carbide (SiC) metal-oxide semiconductor field effect transistor (MOSFET), a silicon (Si) superjunction MOSFET, a Gallium nitride (GaN) field-effect transistor (FET), a SiC junction-gate field-effect transistor (JFET), a wideband-gap (WBG), and an ultra-wideband-gap (UWBG) semiconductor power switching device.

7. The vehicle electrical system of claim 4, wherein the power inverter comprises a plurality of phase legs, with each of the phase legs comprising a pair of the semiconductor switches S1-S6, and each of the phase legs being connected to a corresponding one of the inductors.

8. The vehicle electrical system of claim 7, wherein the plurality of phase legs includes first, second, and third phase legs, and at least one of the semiconductor switches S1-S6 of the first, second, and third phase legs is pulse-width modulated to allow current to flow through an associated one of the first, second, and third phase legs.

9. The vehicle electrical system of claim 8, further comprising a ripple inductor connected in series between the neutral terminal of the electric motor and the accessory load, wherein the ripple inductor is configured to mitigate current ripple and torque disturbance.

10. The vehicle electrical system of claim 9, wherein the at least one accessory load switch comprises a contactor.

11. A vehicle electrical system, comprising:
a rechargeable energy storage system (RESS) having a first voltage;
a power inverter electrically connected to the RESS;
an electric motor having a plurality of machine windings with each of the machine windings including a polyphase terminal electrically connected to the power inverter, and the electric motor further having a neutral terminal separate from the polyphase terminals;
an accessory load selectively connected to one of the RESS and the neutral terminal of the electric motor, with the accessory load requiring a second voltage; and
a controller electrically connected to the power inverter and configured to transmit a plurality of control signals to the power inverter in response to the controller receiving a command for a buck operation;
a first accessory load switch disposed between the neutral terminal of the electric motor and the accessory load;
a second accessory load switch disposed between the RESS and the accessory load;
wherein the power inverter includes semiconductor switches S1, S3, and S5 each disposed between the RESS and a corresponding one of the polyphase terminals, and includes semiconductor switches S2, S4, and S6 each connected between the accessory load and a corresponding one of the polyphase terminals, wherein the semiconductor switches S1-S6 cooperatively convert direct current (DC) power from the RESS to alternating current (AC) power for powering the electric motor via high-frequency switching;
wherein the power inverter is configured to cycle between:
a first operational state where the power inverter connects the RESS to the plurality of machine windings of the electric motor such that current flows from the RESS through the polyphase terminals to the accessory load via closing the first accessory load switch, opening the second accessory load switch, closing one of the semiconductor switches S1, S3, and S5 and opening the remaining semiconductor switches S1-S6;

a second operational state where the power inverter disconnects the RESS from the plurality of machine windings of the electric motor and interrupts current to the machine windings, such that the power inverter steps down the first voltage of the RESS to the second voltage of the accessory load, via closing the first accessory load switch, opening the second accessory load switch, opening the semiconductor switches S1, S3, and S5 to disconnect the RESS from the polyphase terminals, and closing one or more of the remaining semiconductor switches S2, S4, and S6 to allow current to flow from one or more of the polyphase terminals to the accessory load; and a third operational state where the RESS directly charges the accessory load without stepping down the voltage via opening the first accessory load switch and closing the second accessory load switch.

12. The vehicle electrical system of claim 11, wherein the semiconductor switches S1-S6 comprises at least one of a silicon insulated gate bipolar transistor (IGBT), a silicon carbide (SiC) metal-oxide semiconductor field effect transistor (MOSFET), a silicon (Si) superjunction MOSFET, a Gallium nitride (GaN) field-effect transistor (FET), a SiC junction-gate field-effect transistor (JFET), a wideband-gap (WBG), and an ultra-wideband-gap (UWBG) semiconductor power switching device.

13. The vehicle electrical system of claim 11, wherein the accessory load comprises at least one of a propulsion support system, a climate control system, and a driver comfort system.

14. The vehicle electrical system of claim 13, wherein the plurality of machine windings comprise a plurality of inductors.

15. The vehicle electrical system of claim 14, wherein the semiconductor switches S1-S6 are configured to convert direct current (DC) power to alternating current (AC) power.

16. The vehicle electrical system of claim 14, wherein each of the semiconductor switches S1-S6 comprises a voltage-controlled switching device.

17. The vehicle electrical system of claim 16, wherein the power inverter comprises a plurality of phase legs, with each of the phase legs comprising a pair of the semiconductor switches S1-S6, and each of the phase legs being connected to a corresponding one of the inductors.

18. The vehicle electrical system of claim 17, wherein the plurality of phase legs includes first and second phase legs, and at least one of the semiconductor switches S1-S6 of the first and second phase legs is pulse-width modulated to allow current to flow through an associated one of the first and second phase legs.

19. A method of operating a vehicle electrical system comprising:
providing a rechargeable energy storage system (RESS) having a first voltage;
providing a power inverter electrically connected to the RESS;
providing an electric motor having a plurality of machine windings with each of the machine windings including a polyphase terminal electrically connected to the power inverter, and the electric motor further having a neutral terminal separate from the polyphase terminals;
providing an accessory load selectively connected to one of the RESS and the neutral terminal of the electric motor; and
providing a controller electrically connected to the power inverter and configured to transmit a plurality of control signals to the power inverter in response to the controller receiving a command for a buck operation;
providing a first accessory load switch disposed between the neutral terminal of the electric motor and the accessory load;
providing a second accessory load switch disposed between the RESS and the accessory load, wherein the power inverter includes semiconductor switches S1, S3, and S5 each disposed between the RESS and a corresponding one of the polyphase terminals, and includes semiconductor switches S2, S4, and S6 each connected between the accessory load and a corresponding one of the polyphase terminals, wherein the semiconductor switches S1-S6 cooperatively convert direct current (DC) power from the RESS to alternating current (AC) power for powering the electric motor via high-frequency switching;
generating, using the controller, a plurality of control signals in response to the controller receiving a command for a buck operation;
cycling the power inverter between a first operational state, a second operational state, and a third operational state in response to the power inverter receiving the control signals from the controller,
wherein when in the first operational state, the power inverter connects the RESS to the plurality of machine windings of the electric motor such that current flows from the RESS through the polyphase terminals to the accessory load via closing the first accessory load switch, opening the second accessory load switch, closing one of the semiconductor switches S1, S3, and S5 and opening the remaining semiconductor switches S1-S6;
wherein when in the second operational state, the power inverter disconnects the RESS from the plurality of machine windings of the electric motor and interrupts current to the machine windings, such that the power inverter steps down the first voltage of the RESS to the second voltage of the accessory load, via closing the first accessory load switch, opening the second accessory load switch, opening the semiconductor switches S1, S3, and S5 to disconnect the RESS from the polyphase terminals, and closing one or more of the remaining semiconductor switches S2, S4, and S6 to allow current to flow from one or more of the polyphase terminals to the accessory load; and
wherein when in the third operational state, the RESS directly charges the accessory load without stepping down the voltage via opening the first accessory load switch and closing the second accessory load switch.

20. The method of claim 19, wherein the plurality of machine windings comprise a plurality of inductors.

* * * * *